(12) United States Patent
Kawano et al.

(10) Patent No.: US 8,156,331 B2
(45) Date of Patent: Apr. 10, 2012

(54) INFORMATION TRANSFER

(75) Inventors: Seiichi Kawano, Sagamihara (JP); Tadanobu Inoue, Yokohama (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 953 days.

(21) Appl. No.: 11/779,750

(22) Filed: Jul. 18, 2007

(65) Prior Publication Data

US 2008/0022099 A1 Jan. 24, 2008

(30) Foreign Application Priority Data

Jul. 18, 2006 (JP) .................................. 2006-195123

(51) Int. Cl.
*H04L 29/06* (2006.01)
(52) U.S. Cl. ......................... 713/168; 713/189; 713/150
(58) Field of Classification Search .......................... None
See application file for complete search history.

(56) References Cited

U.S. PATENT DOCUMENTS

| | | | | |
|---|---|---|---|---|
| 6,581,162 B1 * | 6/2003 | Angelo et al. | ................ | 713/193 |
| 6,973,566 B2 * | 12/2005 | Smith et al. | ................... | 713/151 |
| 7,376,968 B2 * | 5/2008 | Ritz et al. | ........................ | 726/17 |
| 2003/0041254 A1 * | 2/2003 | Challener et al. | ............. | 713/193 |
| 2007/0271597 A1 * | 11/2007 | Venkatachalam et al. | ........ | 726/4 |

FOREIGN PATENT DOCUMENTS

| | | |
|---|---|---|
| JP | 2000-516373 | 12/2000 |
| JP | 2006-012034 | 1/2006 |
| WO | PCT/US98/08374 | 4/1998 |

OTHER PUBLICATIONS

Shanley, Tom. The Unabridged Pentium 4: IA32 Processor Genealogy . Addison-Wesley Professional, 2004. Print.*

* cited by examiner

*Primary Examiner* — Kambiz Zand
*Assistant Examiner* — Imhotep Durham
(74) *Attorney, Agent, or Firm* — Ference & Associates LLC

(57) ABSTRACT

Methods and apparatus are provided for securely inputting highly confidential information, exchanging the information via a network, and securely reflecting the information in a computer, without the information being stolen by malicious software. Upon a transfer of encrypted information from a server to a computer, the transferred information is stored in a memory of the computer and the computer is switched to a suspended state and immediately thereafter returns to the previous state to be shifted to under the control of a BIOS. The information stored in the memory is decrypted and processed there. Processing information generated based on the processed information is then encrypted and it is transferred to the server after the computer is switched to under the control of the operating system.

18 Claims, 7 Drawing Sheets

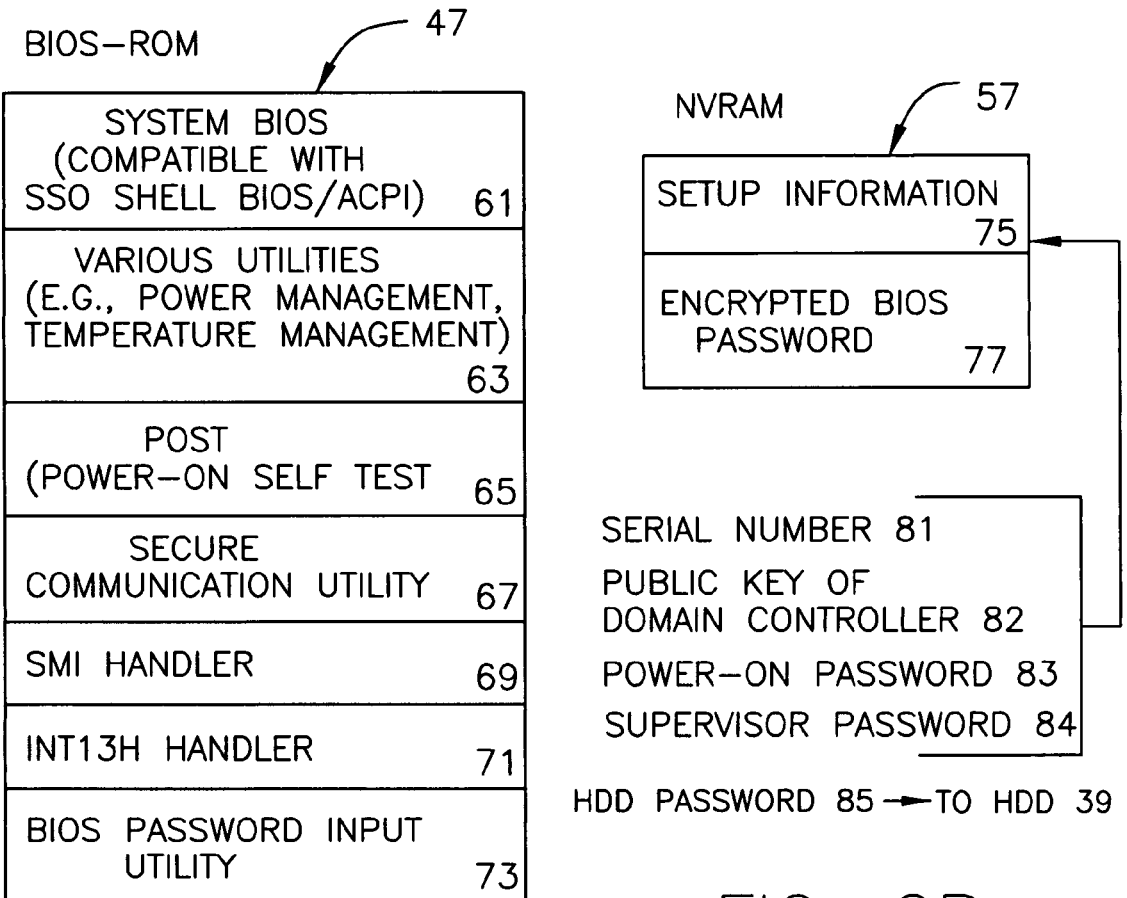
FIG. 2A
FIG. 2B
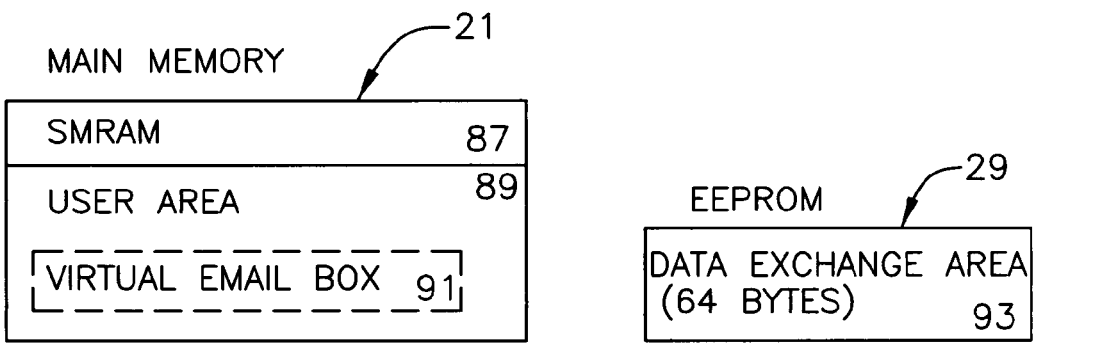
FIG. 2C
FIG. 2D

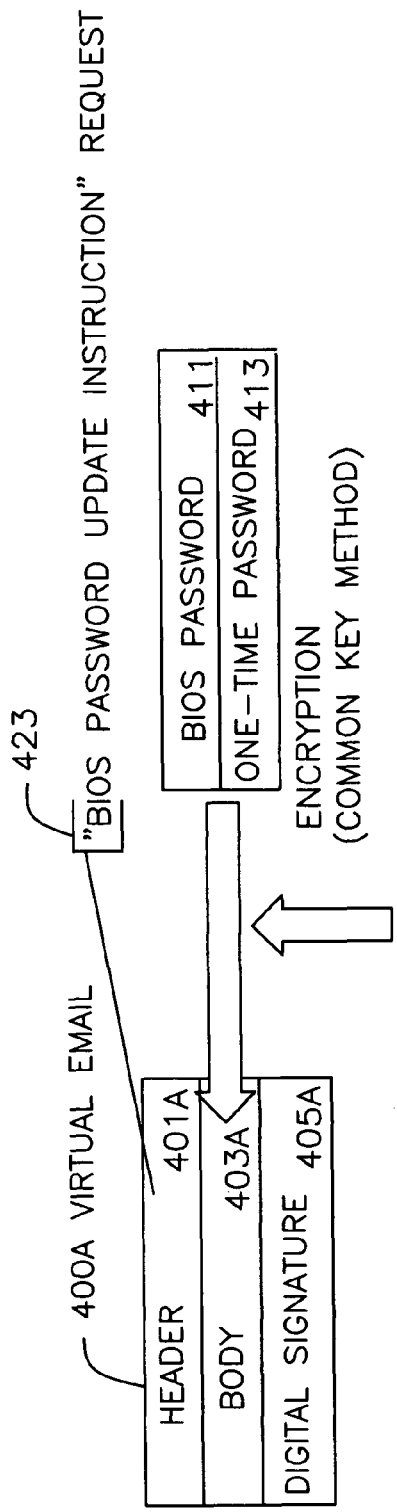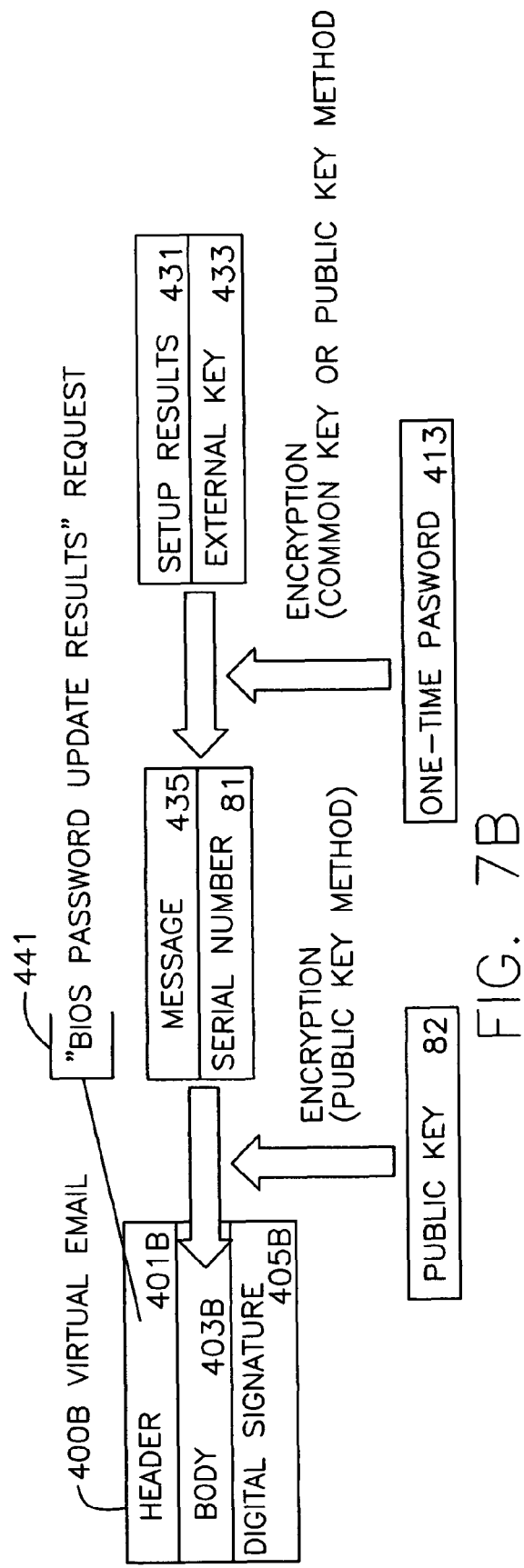

INFORMATION TRANSFER

CLAIM FOR PRIORITY

This application claims priority from Japanese Application No. 2006-195123 filed on Jul. 18, 2006 and is fully incorporated by reference as if fully set forth herein.

FIELD OF THE INVENTION

The present invention relates to a technique that ensures security for exchanging information via a computer network and relates more particularly to a technique for reducing the risks of leaking information via malicious software, such as spyware or key loggers.

BACKGROUND OF THE INVENTION

Personal computers (hereinafter "PCs") are often used at home and in offices, being connected to a network. PCs connected to a network exchange much data with other computers via the network. Data to be exchanged includes very confidential information, such as authentication information related to authentication of users or information related to individual privacy or to business secrets. When such information is misused or altered by a third party on the transmission path of a network, the damages caused will be critical.

A PC which is used in an office environment stores much information related to the authentication of users and of clients, such as passwords for accessing the PC or the hard disk, user identifications (IDs) and passwords for logging into an operating system (hereinafter "OS"), bioinformation data such as fingerprints, for example, related to biometrics authentication, and user IDs and passwords for logging onto an email system or into user group groupware, and must exchange such information via a network. Furthermore, recently, since even a slightly insufficient understanding of a security policy could result in the critical leak of information, there is an increased demand for collectively setting and managing information related to authentication. Naturally, in order to collectively set and manage information related to authentication, a communication system, by which information can be safely exchanged on a network and safely inputted to individual PCs so that the information can be reflected in the setup, is indispensable.

To ensure security, encryption of data is generally performed. Especially widely employed is SSL (Secure Socket Layer), which was developed by Netscape Communications, in the U.S., and is a technique for encrypting information for the transmission and reception of data on the Internet. SSL is a technique for preventing wiretapping and alteration of data and spoofing, by combining security techniques, such as public keys, private key encryption, digital certificates and hash functions. SSL operates at the boundary of a session layer (fifth layer) and a transport layer (fourth layer) in an Open Systems Interconnection (OSI) reference model, and can be transparently employed, without users being especially conscious of it, by using application software that employs a high level protocol, such as Hyper Text Transfer Protocol (HTTP) or File Transfer Protocol (FTP).

In a network constituted by PCs that use WINDOWS (registered trademark) as an OS, computer resources, such as a plurality of PCs and printers, which are theoretically regarded as a single group, are collectively called a domain. In one domain, a computer that manages user IDs and a security policy is called a domain controller. To log in to the domain using a PC that is a domain participant, a user needs only to enter a user ID and a password that are registered on the server that is the domain controller for the pertinent domain (this is called a domain login). At this time, a secure SSL connection is established by performing mutual authentication between the PC and the domain controller, using a system such as LM (Local Area Network (LAN) Manager) authentication, NTLM (WINDOWS (registered trademark) NT LAN Manager) authentication or NTLMv2 (NTLM version 2) authentication. Thus, the PC and the domain controller can safely exchange information related to authentication.

Published Japanese translation of PCT Patent Publication (Kohyo) No. 2000-516373 teaches a technique for providing authentication information related to the authentication of a user. Publication No. 2000-516373 teaches a technique whereby an encryption key stored in a token is processed using a safe memory in a safe processor mode. Using this technique, an encryption key can be safely employed while using only an inexpensive storage device, without special hardware, such as a smart card, being required.

While the safety of a communication route can be ensured by using the above-described SSL, still present is a risk that information stored in the inside of each PC will be leaked. Of special concern is malicious software, such as spyware and key loggers that are recently rampant. Spyware is software that can transmit information present inside a PC, or information for operating a PC, to a third party without permission. Spyware can be installed in a PC at the same time as other application software, or can be installed in a PC while an email attached file or a website is being browsed, in the same manner as can a computer virus. Since many spyware programs operate in the background, without displaying windows, it is difficult for a user operating the PC to detect the presence of such a spyware program. Further, even if the presence of spyware is detected, it may be difficult for a user without special knowledge to remove the spyware from the OS.

Among the variety of spyware programs that can be employed, one that obtains contents entered by a user via a keyboard is specifically called a key logger. Thus, in a PC having such a key logger installed thereon, the key logger can obtain all content entered by a user via a keyboard, so the key logger tends to be employed maliciously, and is especially used to steal highly confidential information, such as passwords and credit card numbers. Of course, since the key logger will operate in the background, it will be difficult for a user operating the PC to detect its presence. Actually, in Japan, the theft of money has occurred using Internet banking passwords that were stolen by employing key loggers.

Intel Corp., in the U.S., has developed a new technology, titled La Grande Technology, that provides a secure computing environment. According to this technology, a secure connection, one that excludes spyware or key loggers, is established between a PC main body and a keyboard to preclude the possibility that user content entered at the keyboard will be stolen. However, for this new technology to be applied, the PC main body, the keyboard, the OS and the device driver are required to correspondingly match the new technology.

On the other hand, when an SMI (System Management Interrupt) input pin (SMI#) is asserted, a central processing unit (CPU) produced by Intel Corp., in the U.S., can operate in an SMM (System Management Mode), which is an operating mode for system management. In the SMM, an SMI handler, which is an interrupt control handler executed by the CPU produced by Intel Corp., is executed in a memory space called SMRAM (System Management Random Access Memory) that is especially allocated in a main memory. Since it is impossible for the OS to directly employ the SMM, the CPU under the control of the OS enters the SMM when the SMI handler is called. In the SMM, the CPU operates in a single tasking because it is controlled by the Basic Input/Output System (BIOS) and all interrupts are regarded as invalid. Further, the SMRAM can be used exclusively by the CPU while operating in the SMM. Therefore, during the period in which the CPU is operating in the SMM, the operation of programs other than the single tasking being performed under the control of the BIOS is not permitted, and the SMRAM cannot be accessed by a process other than that for the program that is currently operating.

That is, the CPU operating in the SMM is especially appropriate for handling confidential information, since in the CPU operating in the SMM, there is no room available for an operation performed by malicious software, such as spyware or key loggers. Employing this technology, as taught in Publication No. 2000-516373, there is a technique for processing confidential information relating to authentication, such as a password, after the CPU is shifted to the SMM. According to the invention taught in Publication No. 2000-516373, an encryption key stored in a token is enabled upon the entry of a valid personal identification number (PIN), and encryption, using this encryption key, is performed in the SMM. For example, in a case where a remote server is logging on, a character string (challenge) received from the remote server under the control of the OS is transmitted to the CPU shifted to the SMM by the SMI handler. The CPU operating in the SMM then employs the above described encryption key to encrypt the received challenge, and generates an encrypted character string (response). The CPU under the control of the OS, after it is returned from the SMM, transmits the response to the remote server to complete the processing related to the logon. However, with this method, there are three problems.

As the first problem, when the CPU is shifted from under the control of the OS to the SMM, by the SMI handler being called via the BIOS, it is in general necessary, from the viewpoint of the architectures of the PC and the OS, for the CPU to complete the operation in the SMM within several tens to several hundreds of milliseconds and to return to the operation under the control of the OS. For example, a process such as the one described in Publication No. 2000-516373, above, in which a key stored in the memory in advance is used to encrypt a character string that also is stored in the memory, can be completed within the above-mentioned time period. However, it takes several seconds, at the minimum, for a user to input characters such as a password via a keyboard, and to display the inputted character. Therefore, the SMM can not be employed for a process for which user input is required. Incidentally, in Publication No. 2000-516373, before an OS is activated, a PIN must be entered and accepted under BIOS control, and thereafter, the encryption key stored in the token is stored in the memory and the OS is started. Further, in another embodiment of Publication No. 2000-516373, after a user has entered the PIN under the control of the OS, the CPU is shifted to the SMM. However, the input of confidential information, such as a PIN, under the control of the OS accompanies a risk that spyware or key loggers may steal the inputted content.

The second problem is as follows. When the CPU is returned to under the control of the OS after it is shifted to the SMM and performs specific data processing, a register of the CPU is usually employed for the exchange of data between the BIOS and an application for which data processing is required. Therefore, when data with a capacity larger than the capacity of the register is processed and exchanged between the application and the BIOS or multiple sets of data are sequentially processed and exchanged, the cycle in which the CPU is returned to under the control of the OS after it is shifted to the SMM and performs data processing must be repeated many times, within a short period of time. This greatly deteriorates the performance of the PC.

As the third problem, an NVRAM (Non-Volatile Random Access Memory) provided for obtaining a manager password and information related to the security of a PC is inhibited from further writing when initialization is performed by a BIOS and completed and the operation of the OS starts, and this inhibition is not removed until a power-ON reset of the PC is performed. Therefore, a writing inhibition to the NVRAM cannot be removed, simply by shifting the CPU to the SMM, and the setup information can not be rewritten. Especially in a case where multiple sets of data related to PC setup information, such as BIOS passwords, are received via a secure communication environment provided by SSL, each time a set of data is received, a power-ON reset of the PC must be performed and the content of the NVRAM must be changed, in order for the received information to be written to the NVRAM and to be reflected to the PC. Accordingly, when multiple sets of data are received, power-ON resets are also repeated multiple times. This greatly deteriorates the usability of the PC.

While the above systems and methods allow for safely transferring information, it would be desirable for such systems and methods to provide for safely transferring information between a server and a PC that are connected via a network, even in an environment where malicious software is operated, without requiring special hardware and without suffering any loss in the performance or the usability of the PC.

SUMMARY OF THE INVENTION

There are broadly contemplated herein, in accordance with at least one presently preferred embodiment of the present invention, new methods and apparatus for safely transferring confidential information between a server and an apparatus, such as a PC, without requiring special hardware and without suffering losses in the performance or the usability of the apparatus.

One aspect of the present invention provides a method comprising: receiving at an apparatus encrypted information from a server; wherein the apparatus is operating under the control of an operating system; in a first storing step, storing the received information into a memory, wherein the apparatus is operating under the control of the operating system; in a first switching step, switching operation of the apparatus from under the control of the operating system to under the control of a BIOS; decrypting, at the apparatus, the information stored in the memory, wherein the apparatus is operating under the control of the BIOS; generating, at the apparatus, processing information based on the information decrypted, wherein the apparatus is operating under the control of the BIOS; and transferring the processing information from the apparatus to the server.

An additional aspect of the present invention provides an apparatus comprising: a receiver which receives encrypted information from a server, wherein the apparatus is operating under the control of an operating system; a memory which stores the received information, wherein the apparatus is operating under the control of an operating system; an arrangement which switches operation of the apparatus from under the control of the operating system to under the control of a BIOS; an arrangement which decrypts the information stored in the memory, wherein the apparatus is operating under the control of the BIOS; an arrangement which generates processing information based on the information decrypted, wherein the apparatus is operating under the control of the BIOS; and a transferer which transfers the processing information from the apparatus to the server.

Yet another aspect of the present invention provides a program storage device readable by machine, tangibly embodying a program of instructions executable by the machine to perform method steps, the method comprising the steps of: receiving at an apparatus encrypted information from a server; wherein the apparatus is operating under the control of an operating system; in a first storing step, storing the received information into a memory, wherein the apparatus is operating under the control of the operating system; in a first switching step, switching operation of the apparatus from under the control of the operating system to under the control of a BIOS; decrypting, at the apparatus, the information stored in the memory, wherein the apparatus is operating under the control of the BIOS; generating, at the apparatus, processing information based on the information decrypted, wherein the apparatus is operating under the control of the BIOS; and transferring the processing information from the apparatus to the server.

BRIEF DESCRIPTION OF THE DRAWINGS

FIGS. 2A to 2D are diagrams showing the internal structures of a BIOS flash ROM (Read Only Memory), a secure NVRAM, a main memory and an EEPROM (Electrically Erasable Programmable Read Only Memory);

FIGS. 7A and 7B are diagrams showing the structures of data that are to be mutually transmitted.

DETAILED DESCRIPTION OF THE PREFERRED EMBODIMENTS

Figure 1:
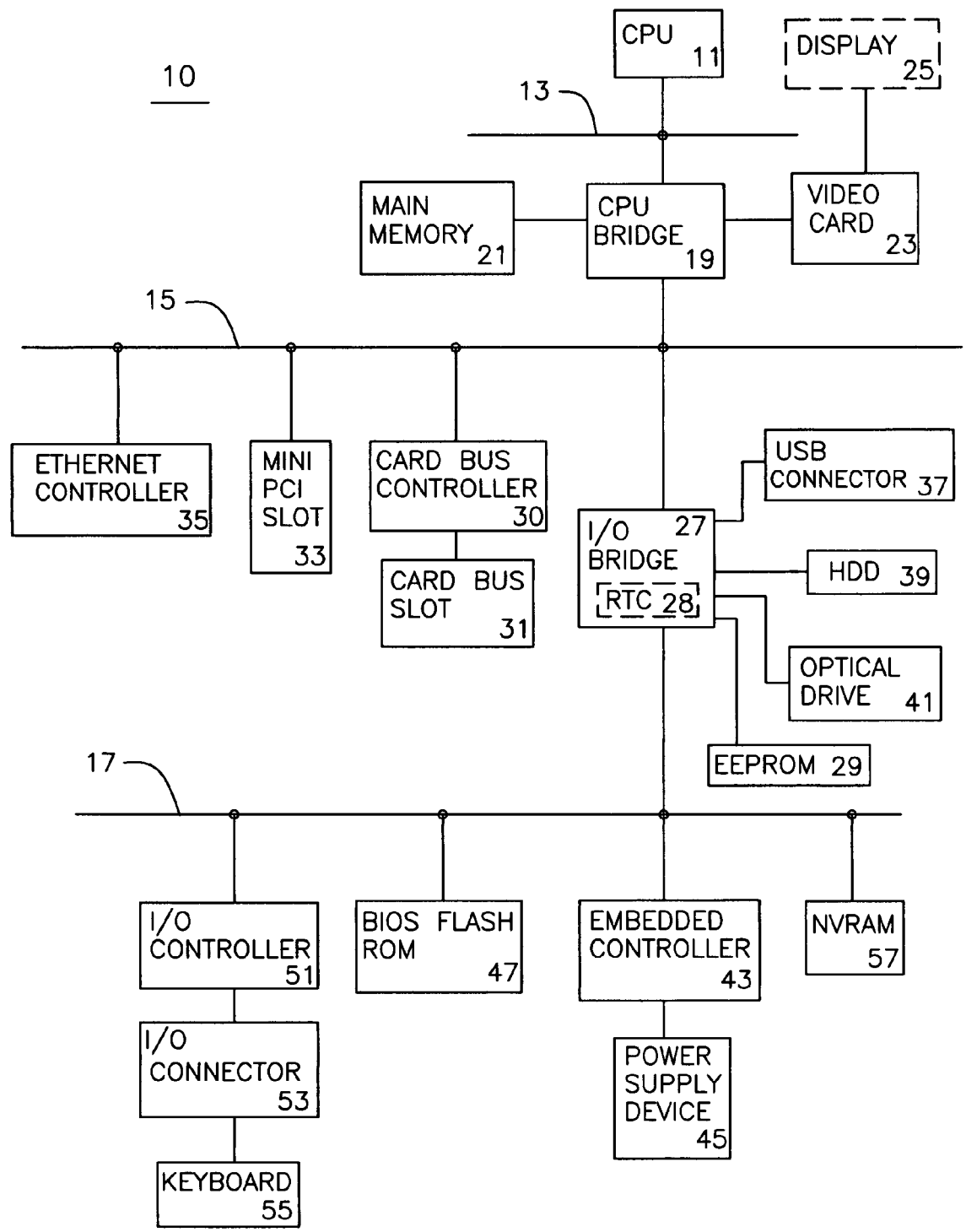
FIG. 1 is a schematic block diagram showing a notebook PC.

For a better understanding of the present invention, together with other and further features and advantages thereof, reference is made to the following description, taken in conjunction with the accompanying figures, and the scope of the invention will be pointed out in the appended claims.

It will be readily understood that the components of the present invention, as generally described and illustrated in the figures herein, may be arranged and designed in a wide variety of different configurations. Thus, the following more detailed description of the embodiments of the apparatus and methods of the present invention, as represented in the figures, is not intended to limit the scope of the invention claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" (or the like) in various places throughout this specification are not necessarily referring to the same embodiment.

Furthermore, the described features, structures, or characteristics may be combined in any suitable manner in one or more embodiments. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will best be understood by reference to the figures, wherein like parts are designated by like numerals or other labels throughout. The following description is intended only by way of example, and simply illustrates certain selected embodiments of devices, systems, and processes that are consistent with the invention as claimed herein.

The disclosure will now provide an overview of the invention before providing a more detailed description of the invention.

One embodiment of the present invention provides methods and an apparatus, such as a computer, for safely transferring information between a server and an apparatus that are connected via a network. Thus, the present invention provides methods and apparatus for transferring confidential information even in an environment where malicious software is operated, without requiring special hardware, such as La Grande technology described above. The present invention provides these methods and apparatus for safely transferring confidential information without suffering any loss in the performance and the usability of the apparatus.

In one embodiment, the present invention provides methods for transferring information between a computer operating under the control of any of an OS and a BIOS and a server connected to the computer via a network. When encrypted information is transmitted by the server to the computer operating under the control of the OS, the encrypted information is stored in the memory of the computer. Then, the operation of the computer under the OS is switched to operation under the control of the BIOS. Under the control of the BIOS, the information stored in the memory is decrypted and processed. Thereafter, processing information is generated based on the information that has been decrypted and processed, and when the control of the computer is returned to the OS, the processing information is transferred to the server. The storage areas of the memory employed for the transfer are not limited to the above-described capacity, e.g., 64 bytes. Therefore, a large volume of encrypted data or multiple sets of encrypted data can be processed by shifting the control operation to the BIOS, and any accompanying deterioration of the performance or the usability can be reduced.

The processing information transferred to the server is stored in the memory by the BIOS, and after the control of the operation of the computer is returned to the OS, the processing information is transferred to the server. Furthermore, the processing information is encrypted and stored in the memory. Thus, the computer under the control of the OS will not process information that is not encrypted. In an environment under the control of the BIOS, which is a single tasking, the operation of malicious software does not occur. Therefore, so long as only encrypted processing information is handled in the environment under the control of the OS, the possibility can be reduced that the information will be obtained by malicious software.

Furthermore, when the control of the computer is switched from the OS to the BIOS, the computer is shifted to a suspended state, and then is immediately resumed, without waiting for an external event to be provided by a user, or via a network. Through this process, while the contents of the memory are saved, the NVRAM is reset, as when a power-ON reset is performed, and writing inhibition is removed. As a result, under the control of the BIOS, the contents of the NVRAM can be rewritten using information transferred from the server. The same effects can be obtained by employing hibernation rather than the suspended state. And since the contents of the memory are saved either by entering a suspended state or hibernation, a nonvolatile memory is not required for the storage of encrypted information or processing information. Furthermore, when an SMI is issued to a processor, a physical address, in the memory, at which the information is written can be transmitted by the OS to the BIOS, and the information can be easily employed by the BIOS.

As described above, when the computer is in the SMM, a limitation of the prior art is that the operation of the computer must be returned to the control of the OS within a period of several tens to several hundreds of milliseconds. However, when the computer resumes to the normal state from the suspended state, and is returned to under the control of the BIOS, the operation is not affected by such a time limitation. Therefore, when information is entered using a keyboard, under the control of the BIOS, in an environment wherein the operation of malicious software does not occur, the entry can be safely accepted and the processing performed using the input information. Further, when the control is switched from the OS to the BIOS, either a screen display or voice can be employed to notify the user that encrypted information has been received from the server. Of course, the reception of such information from outside the computer can also be employed as a trigger for the generation of an event for switching the control to the BIOS.

In one embodiment, the present invention can also provide an apparatus, such as a computer, that can transfer information between it and a server connected via a network. The computer can be regarded as one that includes means for performing the individual steps explained for the above-described information transferring method. Further, the computer can also be regarded as one that includes a processor, a BIOS, a volatile memory, a network interface and a recording medium, and that performs the individual steps based on a program stored on the recording medium. When an OS is one of those in the WINDOWS (registered trademark) series, steps beginning with the reception of encrypted information and continuing until a switch to control by the BIOS can be performed by the modules constituting WINDOWS (registered trademark). That is, the present invention does not require either special hardware or a large scale alteration of the entire OS, and can be provided by the installation of only a little software and by using the BIOS and standard WINDOWS (registered trademark) modules. Of course, the present invention can also be applied for an OS other than WINDOWS (registered trademark), so long as a computer can be connected to a server, via a network, and control can be switched between the OS and the BIOS.

Therefore, according to the present invention, a method can be provided whereby information can be safely transferred between a server and a PC that are connected via a network. Furthermore, a method can be provided whereby, even in an environment wherein malicious software is operating, confidential information can be safely transferred without special hardware, such as the La Grande Technology described above, being required. Further, according to the present invention, a method can be provided whereby confidential information can be safely transferred without adversely affecting the performance and usability of a computer. In addition, according to the present invention, an apparatus, such as a computer, that employs these methods can be provided. Reference is now made to the figures in the remainder of the description.

Referring now to FIG. 1, a schematic block diagram shows the system configuration of a PC 10 according to one embodiment of the present invention. Various devices shown in FIG. 1 are mounted inside the case of the PC 10. A CPU 11 is a central processing unit that provides control for the hub of the PC 10, and that executes an OS, a BIOS, a device driver or an application program. The CPU 11 of this embodiment can operate in the SMM.

For the transmission/reception of signals, the CPU 11 is connected to individual devices via three buses, an FSB (Front Side Bus) 13 that serves as a system bus, a PCI (Peripheral Component Interconnect) bus 15 that is used for communication between the CPU 11 and a peripheral device, and an LPC (Low Pin Count) bus 17 that is an interface that takes the place of an Industry Standard Architecture (ISA) bus. The FSB 14 and the PCI bus 15 are connected by a CPU bridge 19 called a memory/PCI chip. The CPU bridge 19 includes: a memory controller function, for controlling access to a main memory 21; and a data buffer function, for absorbing a difference in a data transfer rate between the FSB 13 and the PCI bus 15. The main memory 21 is a volatile, writable area that is used as a reading area for a program executed by the CPU 11 or as a work area in which processed data is to be written. Also, the main memory 21 includes an area that the CPU 11, when operated in the SMM, can exclusively employ as an SMRAM (System Management Random Access Memory). A video card 23 includes a video chip (not shown) and a VRAM (Video Random Access Memory, not shown). Upon receiving a drawing instruction from the CPU 11, the video card 23 generates an image to be drawn and either writes the image to the VRAM, or transmits, to a display device 25, image drawing data that is read from the VRAM.

An I/O (input/output) bridge 27, a CardBus controller 30, a miniPCI slot 33 and an ETHERNET (registered trademark) controller 35 are connected to the PCI bus 15. The CardBus controller 30 is a controller that controls data transfer between the PCI bus 15 and a PC card (not shown). A CardBus slot 31 is connected to the CardBus controller 30, and a PC card (not shown) is loaded into the CardBus slot 31. A miniPCI card (not shown) that incorporates a wireless LAN module, for example, is loaded into the miniPCI slot 33. The ETHERNET (registered trademark) controller 35 is a controller for connecting the PC 10 to a wired LAN.

I/O bridge 27 serves as a bridge between the PCI bus 15 and the LPC bus 17. The I/O bridge 27 also has an IDE (Integrated Device Electronics) interface function, and a hard disk drive (HDD) 39 and an optical drive 41, such as a Compact Disk (CD) drive or a Digital Versatile Disk (DVD) drive, connected to the I/O bridge 27. A universal serial bus (USB) connector 37 and an EEPROM 29 are also connected to the I/O bridge 27. Various types of peripheral devices (not shown) that are USB compatible are connected to the USB connector 37. The EEPROM 29 is a non-volatile memory, whose contents are electrically rewritable, that will later be described in detail. An embedded controller 43, a BIOS flash ROM 47, an NVRAM 57 and an I/O controller 51 are connected to the LPC bus 17. Input/output devices (not shown), such as a keyboard 55, are connected to the I/O controller 51 via an I/O connector 53. The BIOS flash ROM 47 and the NVRAM 57 will be described later. The I/O bridge 27 also includes an RTC (Real Time Clock) 28 that serves as the incorporated clock of the PC 10.

The embedded controller 43 is a micro computer that includes an 8 to 16 bit CPU, a ROM and a RAM, analog/digital (A/D) input terminals and digital/analog (D/A) output terminals for a plurality of channels, and digital input/output terminals. A cooling fan (not shown), a temperature sensor (also not shown) and a power supply device 45 are connected to the embedded controller 43, and a program related to the management of the operating environment inside the PC 10 can be operated independently of the CPU 11.

Only the primary hardware configuration related to this embodiment and the connections have been simplified and shown in FIG. 1 to describe the embodiment. In addition to the components described above, many other devices are employed to constitute the notebook PC 10. However, since these are well known to one having ordinary skill in the art, detailed explanations for them will not be given here. Of course, a plurality of blocks shown in FIG. 1 may form a single integrated circuit or apparatus, or one block may be divided into a plurality of integrated circuits or devices, and these configurations are also included within the scope of the present invention, so long as one having ordinary skill in the art can arbitrarily select the configurations.

FIGS. 2A to 2D are diagrams showing the internal arrangements of the BIOS flash ROM 47, the NVRAM 57, the main memory 21 and the EEPROM 29 of the notebook PC 10 according to the embodiment of the invention. The BIOS flash ROM 47 shown in FIG. 2A is a nonvolatile memory, for which the contents are electrically rewritable. The BIOS flash ROM 47 stores therein a system BIOS (SSO Shell Bios) 61, which is a basic program used for activation and management of a system; various utilities 63, which are software programs for managing portions of the operating environment, such as power and temperature; a POST (Power-On Self Test) 65, which is software for conducting a hardware test when the PC 10 is started; a communication utility 67, which is related to the present invention; an SMI handler 69, which operates the CPU 11 in the SMM; an INT13H hander 71, which accesses the HDD 39; and a BIOS password input utility 73, which will be described later. The system BIOS 61 can also control the power state related to Advance Configuration and Power Interface (ACPI).

The NVRAM 57 shown in FIG. 2B is a battery backup RAM provided to prevent data loss when the power of the notebook PC 10 is turned off, and can be accessed only by the system BIOS 61. Writing to the NVRAM 57 is inhibited while the OS is being operated by the PC 10, and is not released until the supply of power is reset. Setup information 75 for the device controller of the PC 10 and an encrypted BIOS password 77, which will be described later, are stored, for example, in the NVRAM 57. The setup information 75 mainly includes the order in which disk drives are started, drive numbers, a method for connecting peripheral devices and parameters related to data transfer. A serial number 81 of the PC 10, a public key 82 of a server, and a power-ON password 83 and a supervisor password 84, which will be described later, are also included in the setup information 75. An HDD password 85 is magnetically saved in the management area of the HDD 39.

The main memory 21 shown in FIG. 2C includes a user area 89 employed during the normal operation of the PC system and an area for an SMRAM (System Management Random Access Memory) 87. When the CPU 11 enters the SMM, by calling the SMI handler 69 from the system BIOS 61, and the CPU 11 operates a single tasking, all the interrupts are regarded as invalid. Further, the CPU 11, when operated in the SMM, can exclusively use the SMRAM 87. An area used as a virtual email box 91 related to this invention is prepared in the main memory 21, which will be described later in detail. Referring to FIG. 2C, the virtual email box 91 is included in the user area 89; however, the virtual email box 91 may either be included in the SMRAM area 87, or may be extended between the SMRAM area 87 and the user area 89.

The EEPROM 29 shown in FIG. 2D is nonvolatile memory whose contents are electrically rewritable. Unlike the NVRAM 57, there is an area 93 that is readable/rewritable from and to both the OS and the system BIOS 61, and this area 93 can be employed for the exchange of data between the OS and the system BIOS 61.

Three passwords are employed to activate the PC 10: the power-ON password 83, the supervisor password 84 and the HDD password 85. These passwords are generally called BIOS passwords. When the power of the PC 10 is turned on, and the power-ON password 83 and the HDD password 85 are entered and are authenticated, only the starting of the OS is enabled. When the supervisor password 84 and the HDD password 85 are entered and are authenticated, the starting of the OS and the changing of the entire setup information 75 are enabled. The OS is installed on the HDD 39, and is activated after the BIOS password has been authenticated and the initial hardware setup of the system BIOS 61 has been completed. The type of OS is not specified in this embodiment, and either WINDOWS (registered trademark) or LINUX (registered trademark), for example, can be employed. Hereinafter, in this embodiment, an explanation will be given while assuming that either WINDOWS (registered trademark) 2000 or WINDOWS (registered trademark) XP is being employed.

All the hardware components of the PC 10 and the OS and the BIOS operated by the PC 10 are compatible with an ACPI, and power management is performed by the ACPI. Several power states are defined for the ACPI, and in this embodiment, the suspended state (or power state Suspend To RAM that is abbreviated as STR, or is defined as S3 according to the ACPI) is employed. In the suspended state, the contents stored in the main memory 21 are maintained, and the supply of power is halted to devices other than the main memory 21, such as the CPU 11 and the HDD 39, that constitute the PC 10. As a characteristic, the normal operating state (power state S0 according to the ACPI) can be resumed from the suspended state within a short period of time, and the OS need not be restarted. Further, during a period in which the OS is operating in the normal state, the NVRAM 57 cannot be accessed; but when the PC 10 is shifted to the suspended state, the NVRAM 57 can be accessed by the BIOS.

Figure 3:
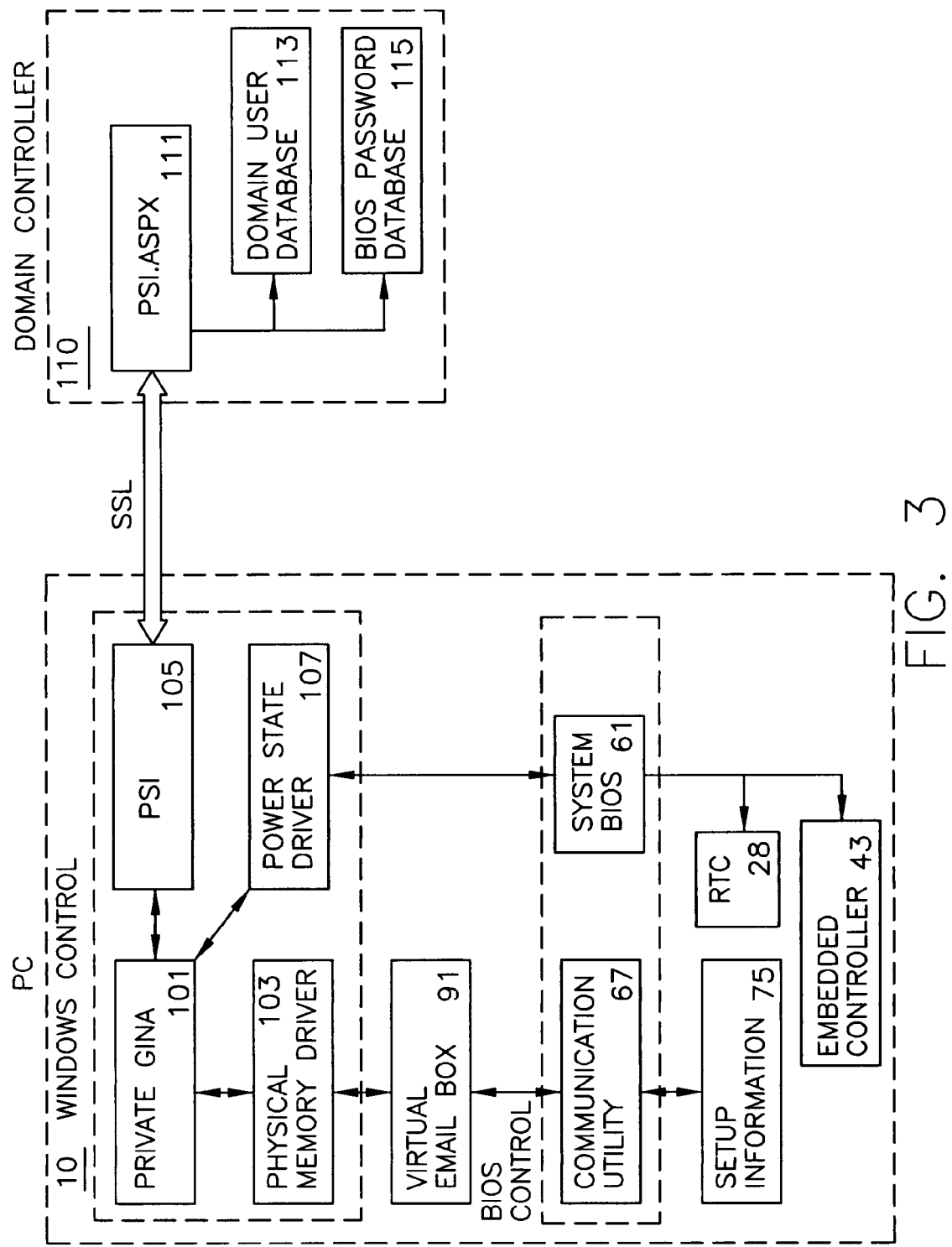
FIG. 3 is a conceptual diagram showing the components used for data transfer.

FIG. 3 is a conceptual diagram showing the individual components employed for data transfer according to one embodiment. In the OS operated by the PC 10, there are the following modules: a private GINA (Graphical Identification and Authentication) 101, a physical memory driver 103, a PSI (Private Security Interface) 105 and a power state driver 107. The private GINA 101 is a GINA that is customized for this embodiment, and is registered as a WINDOWS (registered trademark) component. The GINA 101 is a module that displays, when a user logs on to WINDOWS (registered trademark), a dialogue for the entry of a user ID, a password and a logon destination, and that accepts these entries. In this embodiment, the GINA 101 is used as a module for managing the exchange of data with a server 110, which will be described later, and the exchange of data with the BIOS.

The physical memory driver 103 is installed in WINDOWS (registered trademark) as a kernel mode driver, and exchanges data via the virtual email box 91, which will be described later. The PSI 105 is a WINDOWS (registered trademark) DLL (Dynamic Load Library) that performs secure data communication using the SSL. In this embodiment, the PSI 105 first establishes a connection using the SSL, and then performs secure communication. The power state driver 107 is also installed in WINDOWS (registered trademark) as a kernel mode driver, and collaborates with the system BIOS 61, which is compatible with the ACPI, to perform the management and shifting of the power state according to the ACPI.

The virtual email box 91 is an area obtained by the physical memory driver 103 in the main memory 21. It is impossible for a logical address in the main memory 21 managed by WINDOWS (registered trademark) to be interpreted by the system BIOS 61. However, the physical memory driver 103 can keep a specific physical address in the main memory 21 as a virtual email box 91, and can employ an I/O instruction to issue an SMI via the register of the CPU 11 and transmit, to the system BIOS 61, the physical address designated in the register of the CPU 11. By using this function, specific data can be transmitted by WINDOWS (registered trademark) to the system BIOS 61 and be processed and stored in the virtual email box 91, under the control of the system BIOS 61, and the resultant data can be received by WINDOWS (registered trademark).

Under the control of the system BIOS 61, the communication utility 67 according to this invention is operated and processes data received via the virtual email box 91. The communication utility 67 can also access the setup information 75, stored in the NVRAM 57, and rewrite the contents of the setup information 75. The system BIOS 61 can collaborate with the power state driver 107 to perform the management or shifting of the power state, and can control devices, such as the RTC 28 and the embedded controller 43, that are related to the power state. However, the BIOS has a single task, the operation of the communication utility 67 and the operation of the system BIOS 61 are not performed at the same time. Of course, a program other than a single task operated under the control of the BIOS is not performed.

On the other hand, in the server 110, a module (Active Server Page) called a PSI.aspx (Private Security Interface in Server) 111 is operated. The PSI.aspx 111 can perform secure communication by establishing an SSL connection with the PSI 105 of the PC 10. Through the PSI.aspx 111, the domain user database 113 and the BIOS password database 115 communicate with the PC 10. The user IDs and the passwords of all the users that belong to the domain managed by the server 110 are stored in the domain user database 113. Therefore, the server 110 serves as a domain controller, and can authenticate users of the domain who are attempting a domain logon to all the PCs participating in the domain. The BIOS passwords of all the PCs that belong to the domain managed by the server 110 are stored in the BIOS password database 115. Hereinafter, in this embodiment, it is assumed that the server 110 is "reliable", and the probability that information may be leaked by the server is ignored.

Figure 4:
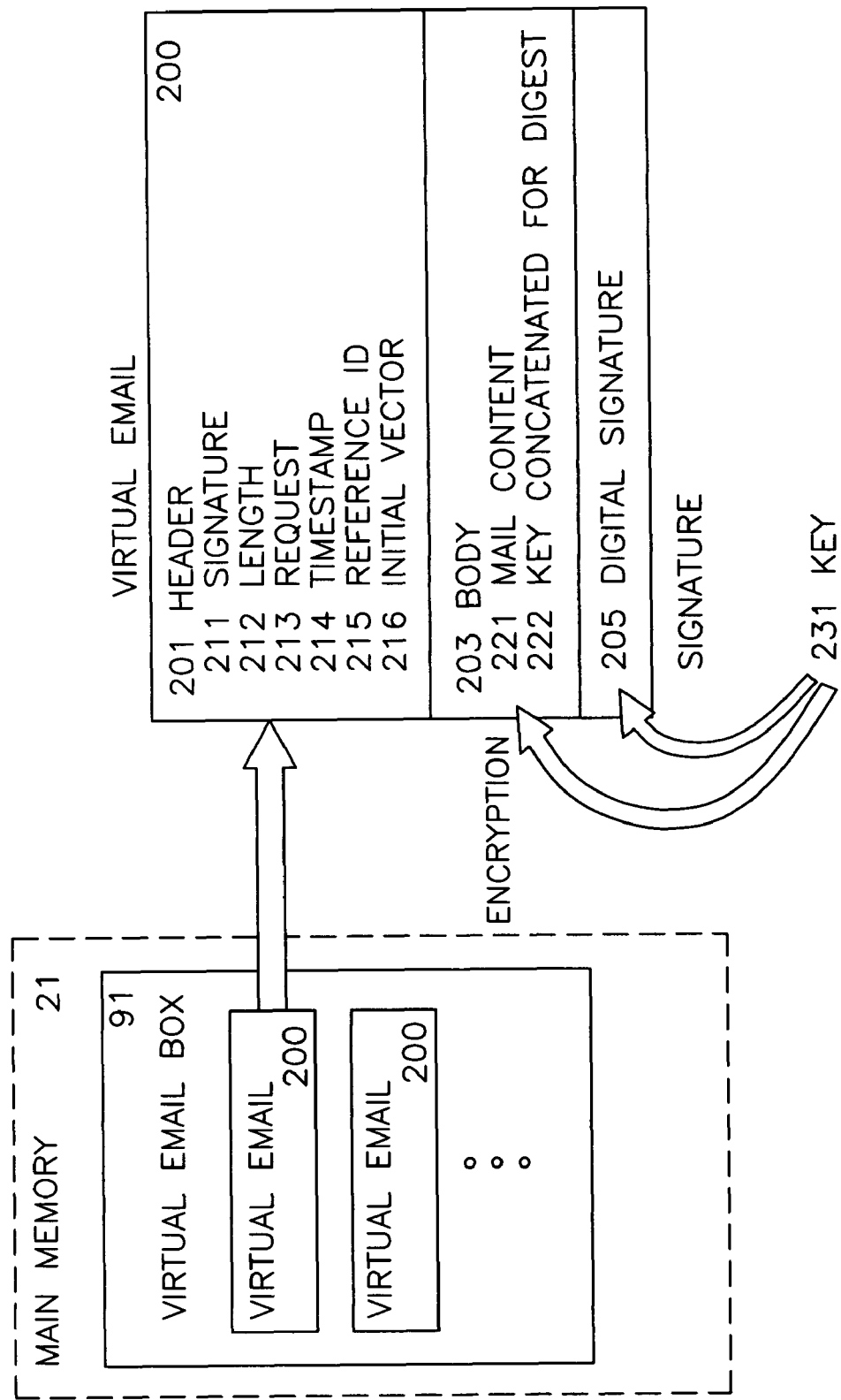
FIG. 4 is a diagram showing the exchange of data between a BIOS and WINDOWS (registered trademark), via a virtual email box.

FIG. 4 is a diagram showing the exchange of data between the BIOS and WINDOWS (registered trademark) via the virtual email box 91. The physical memory driver 103 obtains a sufficiently large area in the main memory 21, and this area is defined as the virtual email box 91. Then, the physical memory driver 103 notifies the system BIOS 61 of an address pertinent to the virtual email box 91. Furthermore, a module that communicates with WINDOWS (registered trademark) stores data in the virtual email box 91 that is to be transmitted to the BIOS as virtual email 200. In this embodiment, a memory capacity of about 4 KB is provided for the virtual email box 91; however, this capacity can be increased, as needed.

The virtual email 200 portrays one unit of encrypted information to be exchanged between the PC 10 and the server 110 as an email, and is formed of a header 201, a body 203 and a digital signature 205. The header 201 includes a signature 211 (Signature) of a data creation source, a total byte count 212 (Length) of data, a data type and processing contents 213 (Request), a transmission date and time 214 (Timestamp), an email ID 215 (Reference ID) and an initial vector 216 (Initial Vector). For the data type and the processing contents 213, a data type is designated, for example, as a "power-ON password" or an "HDD password", and the processing content is designated as an "update instruction" or "updating results". The initial vector 216 is data to be used when common key encryption is performed using the CBC (Cipher Block Chaining) method. The CBC method is one whereby, prior to the encryption of plain text, an XOR (exclusive OR operation) process is performed for the encrypted text of the preceding block, and is characterized in that a repetitive pattern does not appear in encrypted text, even though the plain text includes the repetitive pattern. The body 203 includes an email text 221 (Mail Content) for which data to be transmitted is encrypted, and a key 222 (Key concatenated for Digest) that is used for a digital certificate relative to the email text 21. The digital signature 205 is a digest that is generated based on the header 201 and the email text 221 using the key 231 that is possessed by the server 110 and the system BIOS 61. The key 231 may be a common key, such that both the transmission side and the reception side possess the same key, or either the transmission side or the reception side possesses a secret key and the other side possesses a corresponding public key.

The virtual email 200 prepared by the server 110 is transmitted to the PC 10 via a secure SSL communication channel that is established between the PSI.aspx 111 and the PSI 105. In the PC 10, the received virtual email 200 is transmitted to the system BIOS 61 via the virtual email box 91. On the other hand, the virtual email 200 prepared by the system BIOS 61 is transmitted via the virtual email box 91 to the PSI 105, under the control of the OS, and is delivered to the server 110 via the secure SSL communication channel that is established between the PSI 105 and the PSI.aspx 111. Both the server 110 and the system BIOS 61 employ the key 231 to perform encryption and decryption of the body 203 of the virtual email 200, and the addition and verification of the digital signature 205. That is, in the environment operating in the PC 10 under the control of the OS of the PC 10, the virtual email 200 is sent and received while the body 203 including data to be transmitted is always encrypted, so that the contents of the data are not known even if the body 203 is read by spyware.

The data format of the virtual email 200 shown in FIG. 4 is exactly the same as that for encrypted data that are transmitted/received in the conventional art. The server 110 encrypts information, and transmits the information to the PC 10 in exactly the same manner as in the conventional art. The only difference is that the encrypted data received by the PC 10 is called virtual email 200, and is processed. Also when the server 110 receives virtual email 200 prepared by the PC 10, in exactly the same manner as in the conventional art, the server 110 decrypts and processes the encrypted information that is included in the virtual email 200. In the above description, an expression, such as "the server prepares a virtual email", has been given for the sake of convenience. Actually, in order to perform this embodiment, a hardware component is neither added nor changed for the server.

Figure 5:
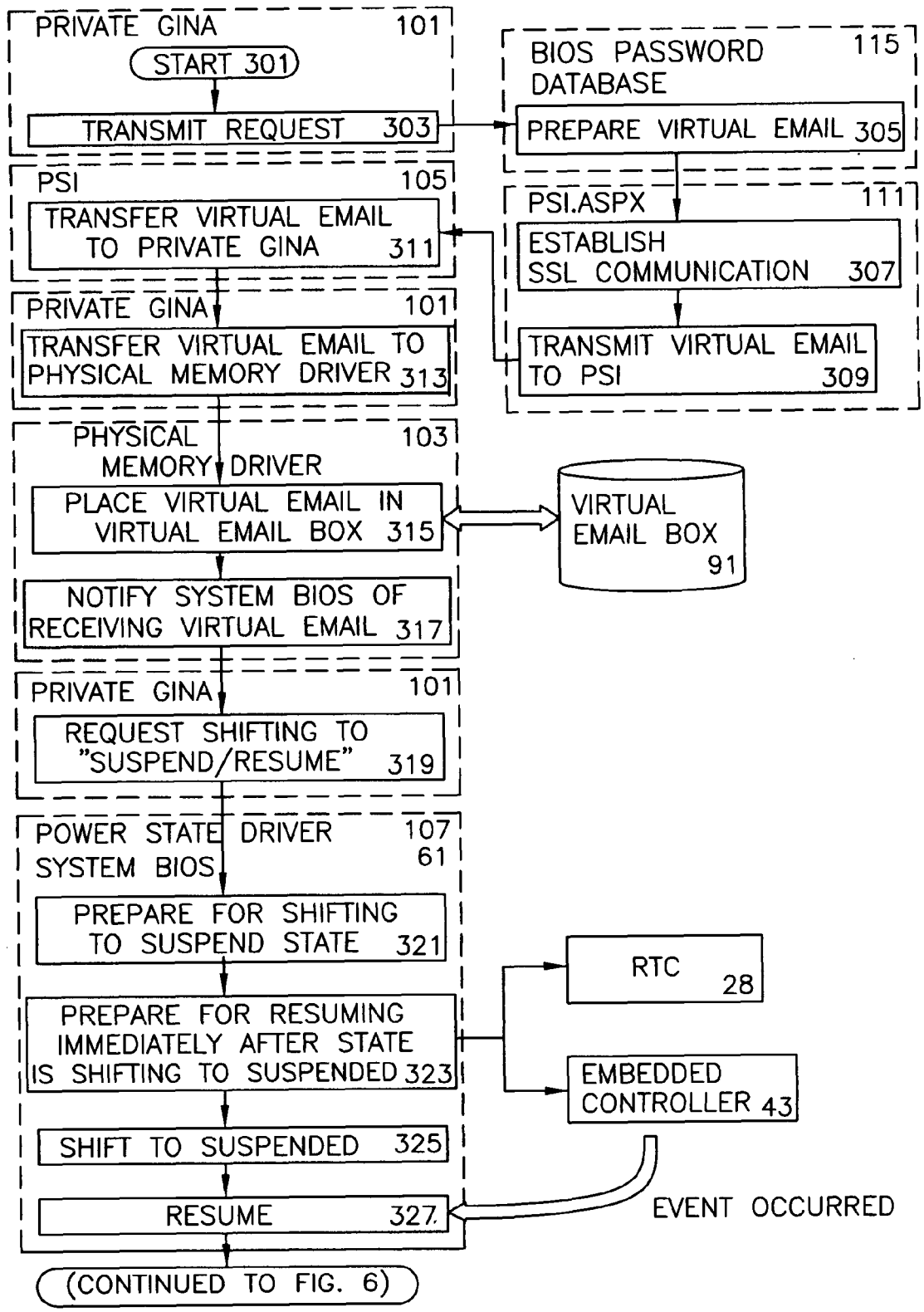
FIG. 5 is a flowchart showing a data transfer operation.
Figure 6:
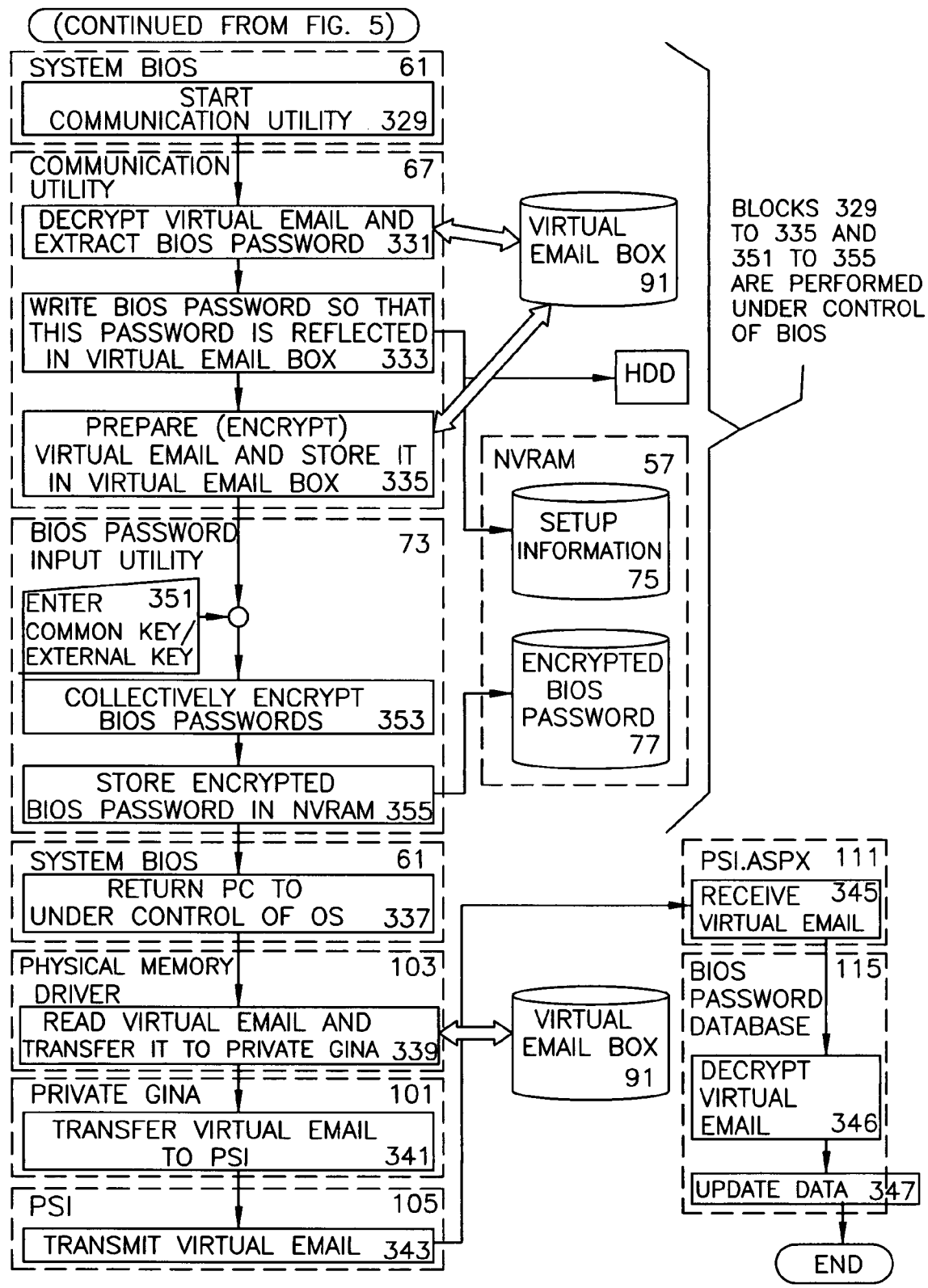
FIG. 6 is a flowchart showing the continuation of the data transfer operation.

FIGS. 5 and 6 are flowcharts showing the data transfer processing performed in this embodiment. In order to avoid complexity in the drawings, the processing is shown in two separate sheets of FIGS. 5 and 6. FIGS. 7A and 7B are diagrams showing the structures of data to be mutually transmitted using the data transfer processing in FIG. 5. In this case, the following processes (1) to (4) are to be sequentially performed between the PC 10 and the server 110: (1) a BIOS password that is set in the BIOS password database 115 by a domain manager is transmitted from the server 110 to the PC 10; (2) the PC 10 sets the BIOS password received from the server 110 for itself, encrypts the BIOS password using an external key entered by a user, and stores the encrypted BIOS password in the NVRAM 57; (3) the PC 10 transmits the setup result to the server 110 by return; and (4) the server 110 updates data in the BIOS password database 115, based on the setup result received from the PC 10.

Assume that the user is authenticated based on the domain user database 113 in the server 110, and has domain-logged on to the PC 10. When the PC 10 transmits a BIOS password setup request to the server 110 via the private GINA 101 (blocks 301 to 303), the following processing is initiated. In this case, the BIOS password setup request is an update setup request because a BIOS password is entered at the time logged on. When a BIOS password is not set for the PC 10, a request is submitted for a new setup. The request to be transmitted includes a host name and serial number 81 of the PC 10, and the ID of a user who has logged on. The server 110 prepares a virtual email 400*a* shown in FIG. 7A in the BIOS password database 115 (block 305). The content of a body 403*a* of the virtual email 400*a* includes a BIOS password 411 and a one-time password 413 that is used only for the current process. For the encryption of the body 403*a* and the preparation of a digital signature 405*a*, a supervisor password 84 for the PC 10, stored in the BIOS password database 115, is employed as a common key 421. A header 401*a* is added to the body 403*a* and the digital signature 405*a*, and the virtual email 400*a* is completed. When there are a plurality of BIOS passwords, accordingly, a plurality of virtual emails 400*a* are prepared. Furthermore, the same common key 421 is employed for all those virtual emails 400*a*, so that the virtual emails 400*a* can be collectively processed. For example, when the power-ON password 83 and the HDD password 85 are to be updated, virtual emails 400*a* are prepared for the power-ON password 83 and for the HDD password 85.

The PSI.aspx 111 establishes secure communication, using the SSL, between the PC 10 and the server 110 (block 307), and transmits the prepared virtual email 400*a* to the PSI 105 (block 309). The virtual email 400*a* received by the PSI 105 is transferred from the private GINA 101 to the physical memory driver 103 (blocks 311 to 313). The physical memory driver 103 stores the virtual email 400*a* in the virtual email box 91 (block 315). When a plurality of virtual emails 400*a* are received, the physical memory driver 103 simultaneously stores these virtual emails 400*a* in the virtual email box 91. The physical memory driver 103 calls the SMI handler 69 and notifies the BIOS 61 of the physical address of the virtual email box 91 and the presence of the virtual email 400*a* (block 317).

At this time, the private GINA 101 requests that the power state driver 107 shift the operating state of the PC 10 to a "suspend/resume" state (block 319). In order to perform the suspend/resume state, the system BIOS 61, which received an instruction from the power state driver 107, makes a preparation to shift the PC 10 to a normal suspended state (block 321) and also makes a preparation to resume the PC 10 immediately after it has been shifted to the suspended state (block 323). The preparation for resuming immediately after the PC 10 is shifted to the suspended state is a process that a device, such as the RTC 28 or the embedded controller 43 which is controlled by the system BIOS 61, is caused to generate an event related to the resume immediately after the PC 10 is shifted to the suspended state. When the system BIOS 61 has completed these processes, the PC 10 is shifted to the suspended state (block 325) and then immediately resumed, and enters the operation under the control of the system BIOS 61 (block 327). At this time, the PC 10, which is inhibited from writing and reading to and from the NVRAM 57 under the control of the OS, is allowed to write and read to and from the NVRAM 57.

In the PC 10 that is resumed, the communication utility 67 stored in the system BIOS 61 is started (block 329), and enters a process for decrypting the body 403*a* of the virtual email 400*a* stored in the virtual email box 91. Since power is continuously supplied to the main memory 21, regardless of whether the PC 10 has entered the suspended state or not, the contents of the virtual email box 91 are saved. The body 403*a* is decrypted using the supervisor password 84, which is the common key 421 and is included in the setup information 75 for the NVRAM 57, and a new BIOS password 411 transmitted by the server 110 is extracted (block 331). When the extracted BIOS password 401 is a power-ON password 83 or a supervisor password 84, the BIOS password 411 is written to the setup information 75 stored in the NVRAM 57, so that the power-ON password 83 or the supervisor password 84 is reflected in the setup information 75. When the extracted BIOS password 411 is an HDD password 85, the HDD password 85 is written to the HDD 39, so that the HDD password 85 is reflected in the HDD 39 (block 333). When the processing is completed, the communication utility 67 deletes this virtual email 400*a* from the virtual email box 91. And when a plurality of virtual emails 400 are to be processed, the processing at blocks 327 to 333 is repeated a number of times equivalent to the number of the virtual emails 400*a*. In this case, the common key 421 may be entered by the user and the common key is not maintained in the PC 10. The common key 421 may be either a password that can be stored in the server 110 and can be entered by a user, or a password other than the supervisor password 84.

In order to notify the server 110 of the setup result for the BIOS password, the communication utility 67 prepares a virtual email 400*b* shown in FIG. 7B, and stores the virtual email 400*b* in the virtual email box 91 (block 335). The body 403*b* of the virtual email 400*b* includes a message 435 that is obtained by encrypting a message 431, which represents the setup result, using a one-time password 413 that is received via the virtual email 400*a*, and the serial number 81 of the PC 10. Either the common key method or the public key method may be employed for the encryption using the one-time password 413. A public key 82, which the server 110 opens to computers that participate to the domain, is employed for the encryption of the body 403*b* and the preparation of a digital signature 405*b*. This public key 82 may be either received in advance and written in the setup information 75, or downloaded when the PC 10 accesses the server 110. Furthermore, the header 401*b* is added to the body 403*b* and the digital signature 405*b*, and the virtual email 400*b* is completed. After the preparation of the virtual email 400*b* has been completed, the one-time password 413 used for the preparation is abandoned, and is not saved in the PC 10.

Since the above described processing at blocks 327 to 335 is performed under the control of the system BIOS 61, the CPU 11 operates a single tasking. Further, for this processing, the SMRAM 87 that the CPU 11 can exclusively refer to is employed. Therefore, spyware or a key logger operating in the operating environment of the OS cannot obtain these decrypted data and input data. It should be noted that sequentially, the processing is performed by the BIOS password input utility 73 under the control of the system BIOS 61 (blocks 351 to 355), which will be described later.

In order to transfer the virtual email 400b to the server 110, the system BIOS 61 returns the PC 10 to the operating environment of the OS (block 337). When the PC 10 is returned to the operating environment of the OS, the reading and writing from and to the NVRAM 57 is inhibited. The private GINA 101 obtains the virtual email 400b via the physical memory driver 103 (block 339), and transmits the received virtual email 400b via the PSI 105 to the PSI.aspx 111 of the server 110 (blocks 341 to 343). Following this, the BIOS password database 115 receives the virtual email 400b via the PSI.aspx 111, and decrypts the body 403b using a secret key, which is possessed by the server 110 and corresponds to the public key 82, and the one-time password 413, which is issued by the BIOS password database 115. And based on the contents obtained by decryption, the data in the BIOS password database 115 is updated (blocks 345 to 347). Thereafter, the processing during which the server 110 sets the BIOS password for the PC 10 is completed (block 349).

When the BIOS password is set for the PC 10 under the control of the BIOS, the BIOS password input utility 73 performs a process for collectively encrypting a plurality of BIOS passwords for the PC 10 to obtain one password, and for storing the encrypted password. The BIOS password input utility 73 requests that a user enters an external key 433 (block 351), employs the received external key 433 to encrypt a BIOS password (block 351), and stores the encrypted BIOS password 77 in the NVRAM 57 (block 353). This encryption is performed using a common key method, while a password entered by a user is employed as the external key 433. When the PC 10, for which the BIOS password is set, is to be booted, the BIOS password input utility 73 requests that the user enters the external key. Using the external key that is input, the BIOS password input utility 73 decrypts the encrypted BIOS password 77, and then transmits to the system BIOS 61 and the HDD 39, the obtained power-ON password 83 (or the supervisor password 84) and the HDD password 85. When these BIOS passwords have been authenticated, the PC 10 enables the initialization of the system by the system BIOS 61 and the booting of the OS. According to this method, the user can employ, as the external key 433, a password that is easy to remember, and does not need to store the external key 433 in the PC 10.

The external key 433 used for the preparation of the encrypted BIOS password 77 may be encrypted using the one-time password 405, and at block 339, may be transmitted to the server 110, together with the message 435 that is included in the body 403b of the virtual email 400b prepared at block 335, and may be stored in the BIOS password database 115 at block 341. As a result, if the user forgets the external key and cannot start the PC 10, as a relief measure, the user can employ the external key stored in the BIOS password database 115.

Furthermore, in reverse, the server 110 may transmit a new BIOS password setup request or an updating request to the PC 10, so that the above described processing can also be started. For example, in a case wherein there is a PC in the domain that does not periodically update the BIOS password or the external key 433, an updating request is transmitted to the PC while the PC is being operated, so that the BIOS password or the external key 433 can actually be updated. However, when a request is transmitted, there is a case wherein a BIOS password setup operation cannot be immediately begun, e.g., a case wherein the user is performing an operation using the PC. In such a case, it is preferable that upon receiving a request from the server 110, the PC 10 displays, on the display device 25, a message that a BIOS password setup request has been received, and to thus notify the user. The user can then choose to start the BIOS password setup either immediately, or after the current operation has been completed. When the above described embodiment has been employed by a system that collectively designates and manages a security policy, the BIOS passwords can be set for all the PCs that are in the domain, and can be collectively managed by the server.

In this embodiment, only hardware provided as standard for most of PCs is employed. Therefore, the embodiment can be performed simply by installing and changing software. Software components to be newly installed are the private GINA 101, the physical memory driver 103, the power state driver 107 and the communication utility 67. The system BIOS 61 is changed to cope with the operation inherent to this embodiment. As described above, the hardware for the server also need not be changed. Further, in the above embodiment, the domain of the network (a LAN or a WAN (Wide Area Network)) constructed by a PC that employs WINDOWS (registered trademark) as an OS has been described; however, the present invention is not limited to this network domain. And of course, the OS is not limited to the WINDOWS (registered trademark) series. Furthermore, so long as secure communication can be established between a server and a PC, the communication method need not be limited to the SSL, and modules used for communication are not limited to the PSI 105 and the PSI.aspx 111.

The embodiment described above can be applied in many places where the transmission and entry of confidential information via a network is required. For example, the method of the present invention can be provided as communication software for exchanging very secret information, such as that for Internet banking, via the Internet. Further, the method of the present invention can be incorporated in, as a plug-in, a web browser, such as the INTERNET EXPLORER (registered trademark), and can be employed to exchange data with a web site.

Additionally, in the above embodiment, the "suspend/resume" is employed to shift the PC 10 to the state under the control of the system BIOS 61. However, the operation for resuming the PC 10 immediately from the state wherein hibernation is performed (the power state defined as S4 according to the ACPI, or also known as Suspend To Disk, abbreviated as STD) can also be employed for the same purpose. And when hibernation is performed, the contents stored in the main memory 21 are saved on the HDD 39, and the supply of power to the main memory 21 is halted. However, when the PC 10 is resumed from this state, the supply of power to the main memory 21 is restarted, and the contents that were stored in the main memory 21 are restored thereto from the HDD 39. That is, since the contents of the virtual email box 91 are also restored, the succeeding process related to the virtual email 400a can be performed in the same manner as when the suspending process is employed.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference as if set forth in their entirety herein.

The present invention has been described while referring to the specific embodiment illustrated in the drawings. However, the present invention is not limited to this embodiment, and of course, so long as the effects provided by the present invention are obtained, any kind of well known configuration can be employed.

What is claimed is:

1. A method comprising:
    receiving at an apparatus encrypted information from a server, wherein the apparatus is operating under the control of an operating system;
    in a first storing step, storing the received information into a memory, wherein the apparatus is operating under the control of the operating system;
    in a first switching step, switching operation of the apparatus from under the control of the operating system to under the control of a BIOS, wherein the first switching step includes one of:
        shifting the apparatus to a suspended state; and immediately resuming the apparatus from the suspended state to under the control of the BIOS; and
        permitting the apparatus to perform hibernation; and immediately resuming the apparatus from the hibernation to under the control of the BIOS;
    decrypting, at the apparatus, the information stored in the memory, wherein the apparatus is operating under the control of the BIOS;
    generating, at the apparatus, processing information based on the information decrypted, wherein the apparatus is operating under the control of the BIOS;
    storing the processing information in an encrypted form in the memory, wherein the apparatus is operating under the control of the BIOS; and
    transferring the processing information from the apparatus to the server responsive to switching operation of the apparatus from under the control of the BIOS to under the control of the operating system.

2. The method according to claim 1, wherein the step of transferring includes the steps of:
    in a second storing step, storing the processing information in a memory of the apparatus, wherein the apparatus is operating under the control of the BIOS;
    in a second switching step, switching the operation of the apparatus from under the control of the BIOS to under the control of the operating system; and
    transferring the processing information stored in said second storing step from the apparatus to the server, wherein the apparatus is operating under the control of the operating system.

3. The method according to claim 1, wherein the step of decrypting the information includes the step of storing, in a nonvolatile memory of the apparatus, information obtained by decryption.

4. The method according to claim 1, wherein under the control of the BIOS, the contents of non-volatile memory can be rewritten using information transferred from the server.

5. The method according to claim 1, wherein the step of generating processing information includes the steps of:
    accepting entry of information via a user input device associated with the apparatus; and
    generating processing information based on the information entered via the user input device.

6. The method according to claim 1 further comprising:
    receiving externally an event for executing the first switching step.

7. An apparatus comprising:
    a receiver which receives encrypted information from a server, wherein the apparatus is operating under the control of an operating system;
    a memory which stores the received information, wherein the apparatus is operating under the control of an operating system;
    an arrangement which switches operation of the apparatus from under the control of the operating system to under the control of a BIOS, wherein the switching includes one of:
        shifting the apparatus to a suspended state; and immediately resuming the apparatus from the suspended state to under the control of the BIOS; and
        permitting the apparatus to perform hibernation; and immediately resuming the apparatus from the hibernation to under the control of the BIOS;
    an arrangement which decrypts the information stored in the memory, wherein the apparatus is operating under the control of the BIOS;
    an arrangement which generates processing information based on the information decrypted and stores the processing information in an encrypted form in the memory, wherein the apparatus is operating under the control of the BIOS; and
    a transferer which transfers the processing information from the apparatus to the server responsive to switching operation of the apparatus from under the control of the BIOS to under the control of the operating system.

8. The apparatus according to claim 7, further comprising:
    a memory which stores the processing information, wherein the apparatus is operating under the control of the BIOS;
    an arrangement which switches the operation of the apparatus from under the control of the BIOS to under the control of the operating system; and
    a transferer which transfers the processing information stored in the apparatus to the server, wherein the apparatus is operating under the control of the operating system.

9. The apparatus according to claim 7, wherein the arrangement which decrypts the information stored in the memory of the apparatus is adapted to store, in a nonvolatile memory of the apparatus, information obtained by decryption, wherein the apparatus is operating under the control of the BIOS.

10. The apparatus according to claim 7, wherein under the control of the BIOS, the contents of non-volatile memory can be rewritten using information transferred from the server.

11. The apparatus according to claim 7, wherein the arrangement which generates the processing information is adapted to:
    accept entry of information via a user input device associated with the apparatus; and
    generate processing information based on the information entered via the user input device.

12. The apparatus according to claim 7 further comprising:
    an arrangement which receives externally an event for switching the operation of the apparatus from under the control of the operating system to under the control of the BIOS.

13. A program storage device readable by machine, tangibly embodying a program of instructions executable by the machine to perform method steps, the method comprising the steps of:
    receiving at an apparatus encrypted information from a server; wherein the apparatus is operating under the control of an operating system;
    in a first storing step, storing the received information into a memory, wherein the apparatus is operating under the control of the operating system;

in a first switching step, switching operation of the apparatus from under the control of the operating system to under the control of a BIOS, wherein the first switching step includes one of:
- shifting the apparatus to a suspended state; and immediately resuming the apparatus from the suspended state to under the control of the BIOS; and
- permitting the apparatus to perform hibernation; and immediately resuming the apparatus from the hibernation to under the control of the BIOS;

decrypting, at the apparatus, the information stored in the memory, wherein the apparatus is operating under the control of the BIOS;

generating, at the apparatus, processing information based on the information decrypted, wherein the apparatus is operating under the control of the BIOS;

storing the processing information in an encrypted form in the memory, wherein the apparatus is operating under the control of the BIOS; and transferring the processing information from the apparatus to the server responsive to switching operation of the apparatus from under the control of the BIOS to under the control of the operating system.

14. The method according to claim 1, further comprising exchanging information between the BIOS and the operating system via a virtual messaging system comprised of virtual emails managed through a virtual email box arranged within the memory.

15. The method according to claim 14, wherein the virtual messaging system further comprises exchanging information between the operating system and the server.

16. The method according to claim 15, wherein exchanging information between the operating system and the server comprises:
- switching operation of the apparatus from the BIOS to the operating system;
- transmitting the virtual email to the server via a Private Security Interface (PSI) module operating on the apparatus.

17. The method according to claim 14, wherein a module in communication with the operating system stores data in the virtual email box for transmitting to the BIOS via virtual email.

18. The method according to claim 14, wherein the virtual email comprises encrypted information for exchange between the apparatus and the server.

* * * * *